United States Patent
Elumalai et al.

(10) Patent No.: US 12,477,174 B2
(45) Date of Patent: Nov. 18, 2025

(54) METHODS AND SYSTEMS FOR AUTOMATED VIDEO END CREDITS DETERMINATION

(71) Applicant: Charter Communications Operating, LLC, St. Louis, MO (US)

(72) Inventors: Ramachandran Elumalai, Parker, CO (US); Jeffrey Scott Gillings, Lakewood, CO (US); Gregory Failla Reilly, Lone Tree, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 79 days.

(21) Appl. No.: 18/606,323

(22) Filed: Mar. 15, 2024

(65) Prior Publication Data

US 2025/0294208 A1    Sep. 18, 2025

(51) Int. Cl.
*H04N 21/44*    (2011.01)
*H04N 21/431*    (2011.01)
*H04N 21/482*    (2011.01)

(52) U.S. Cl.
CPC ... *H04N 21/44008* (2013.01); *H04N 21/4312* (2013.01); *H04N 21/482* (2013.01)

(58) Field of Classification Search
CPC ....... H04N 21/44008; H04N 21/44222; H04N 21/8455; H04N 21/84; H04N 21/251; H04N 21/4666
See application file for complete search history.

(56) References Cited

U.S. PATENT DOCUMENTS

| | | | |
|---|---|---|---|
| 9,418,296 B1 | 8/2016 | Kansara | |
| 10,848,791 B1 * | 11/2020 | Germano | G11B 27/28 |
| 11,582,522 B1 * | 2/2023 | Mahyar | H04N 21/4532 |
| 2008/0134251 A1 | 6/2008 | Blinnikka | |
| 2019/0294729 A1 * | 9/2019 | Jiang | G06F 16/7844 |
| 2020/0068253 A1 * | 2/2020 | Kim | H04N 21/44008 |
| 2020/0204838 A1 * | 6/2020 | Badawiyeh | H04N 21/812 |
| 2020/0288184 A1 * | 9/2020 | Robideaux | H04N 21/23424 |
| 2021/0409822 A1 * | 12/2021 | Aher | H04N 21/47217 |
| 2023/0056988 A1 * | 2/2023 | Welch | H04N 21/262 |
| 2025/0247588 A1 * | 7/2025 | Murudkar | G06V 20/70 |

* cited by examiner

*Primary Examiner* — Jason Salce
(74) *Attorney, Agent, or Firm* — Young Basile Hanlon & MacFarlane, P.C.

(57) ABSTRACT

Methods and systems for automatically determining video end credits. A method includes generating, by multiple automated video end credits processors, tags for videos in a training data set. A tag-generation scoring system and/or unit combines the tags from the multiple automated video end credits processors using combination parameters to generate combination tags, where combinations are done per video, scores each of the tags and the combination tags based on comparisons to training tags in the training data set for the videos to generate scores, where a score reflects accuracy of a tag, generates statistics based on the comparisons and on the scores across all of the videos, and selects an optimal combination of the multiple automated video end credits processors based on application of priority weights to the statistics.

20 Claims, 8 Drawing Sheets

METHODS AND SYSTEMS FOR AUTOMATED VIDEO END CREDITS DETERMINATION

TECHNICAL FIELD

This disclosure relates to video processing. More specifically, this disclosure relates to determining a position of end credits in a video.

BACKGROUND

Enabling television or content viewers or customers to watch the next episode easily and quickly can result in an increase in the number of shows that customers watch. This, in turn, can increase a service provider's revenue. Auto-enabling or providing a notification button or link for the next episode requires knowing a position of the end credits in the currently playing video. Some service providers make this determination manually for the videos or supplement certain automated techniques as the current automated techniques are not sufficiently accurate. However, this is inefficient and unsatisfactory when handling large volumes of videos.

SUMMARY

Disclosed herein are methods and systems for automated video end credits determination.

In embodiments, a method for automated video end credits determination includes generating, by multiple automated video end credits processors, tags for videos in a training data set, combining, by a tag-generation scoring system and/or unit, the tags from the multiple automated video end credits processors using combination parameters to generate combination tags, wherein combinations are done per video, scoring, by the tag-generation scoring system and/or unit, each of the tags and the combination tags based on comparisons to training tags in the training data set for the videos to generate scores, wherein a score reflects accuracy of a tag, generating, by the tag-generation scoring system and/or unit, statistics based on the comparisons and on the scores across all of the videos, and selecting, by the tag-generation scoring system and/or unit, an optimal combination of the multiple automated video end credits processors based on application of priority weights to the statistics.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
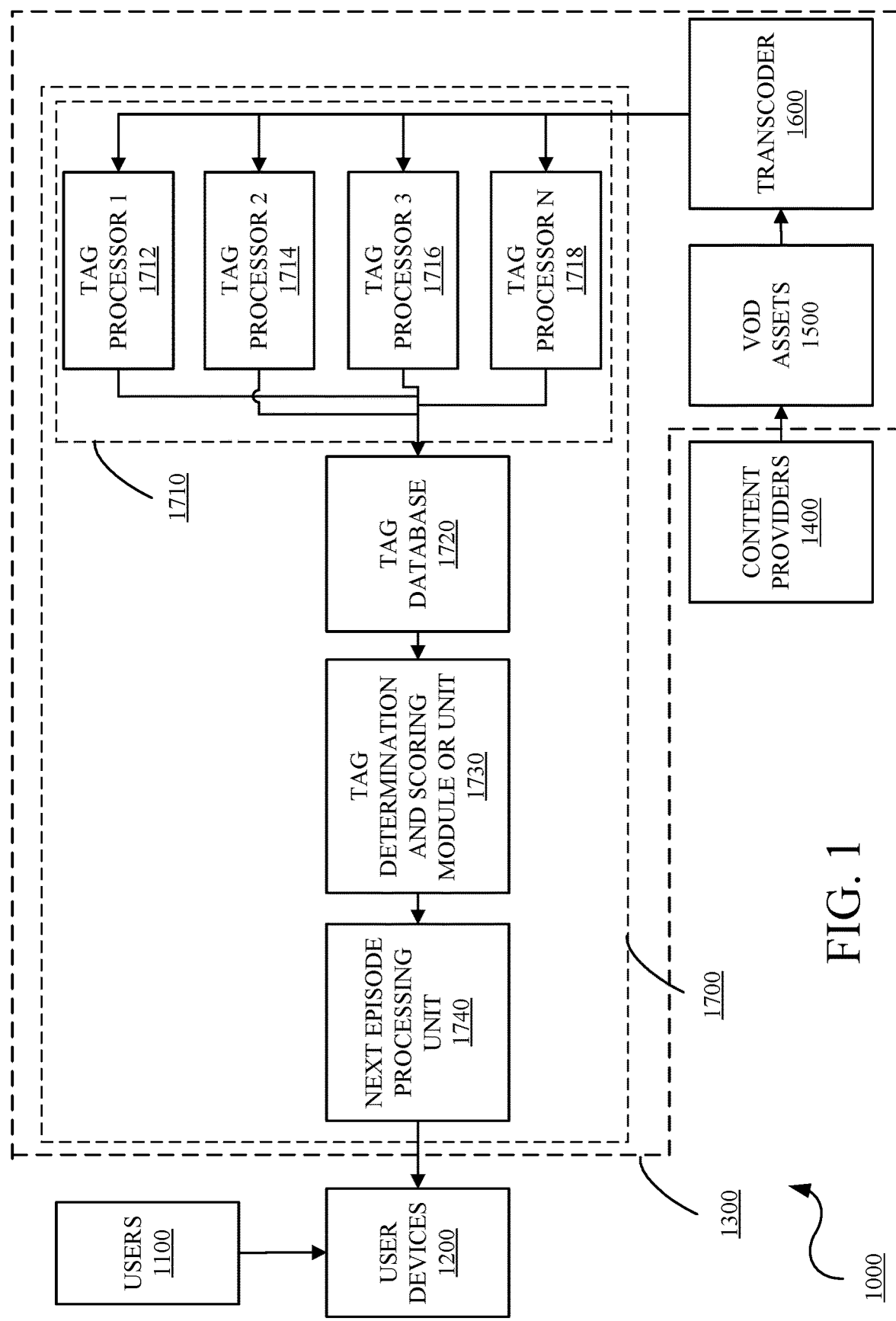
FIG. 1 is a diagram of an example architecture for automated determining of video end credits in accordance with some embodiments of this disclosure.
Figure 2:
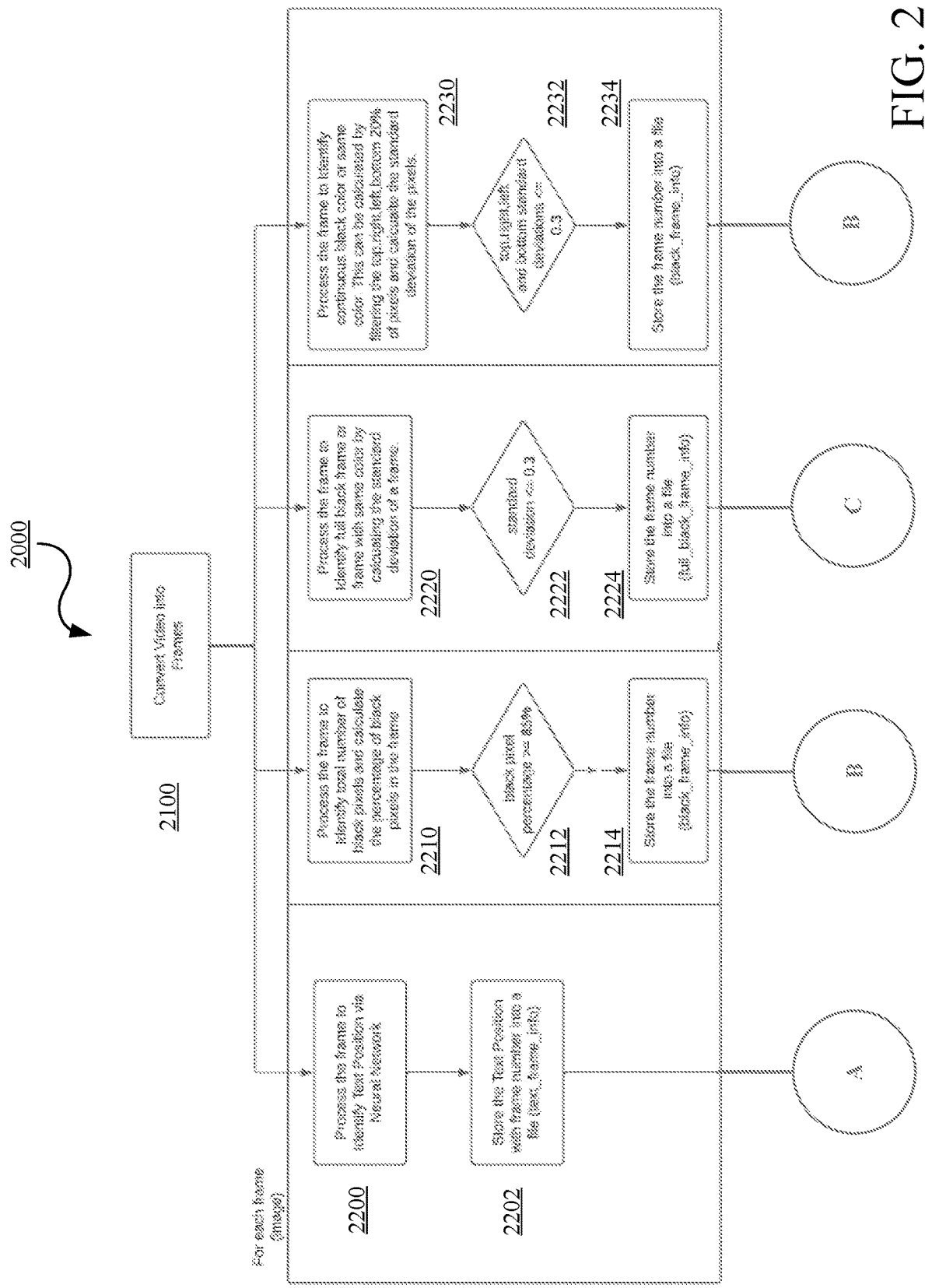
FIGS. 2-5 are a flow diagram of an example tag determination process in accordance with some embodiments of this disclosure.
Figure 3:
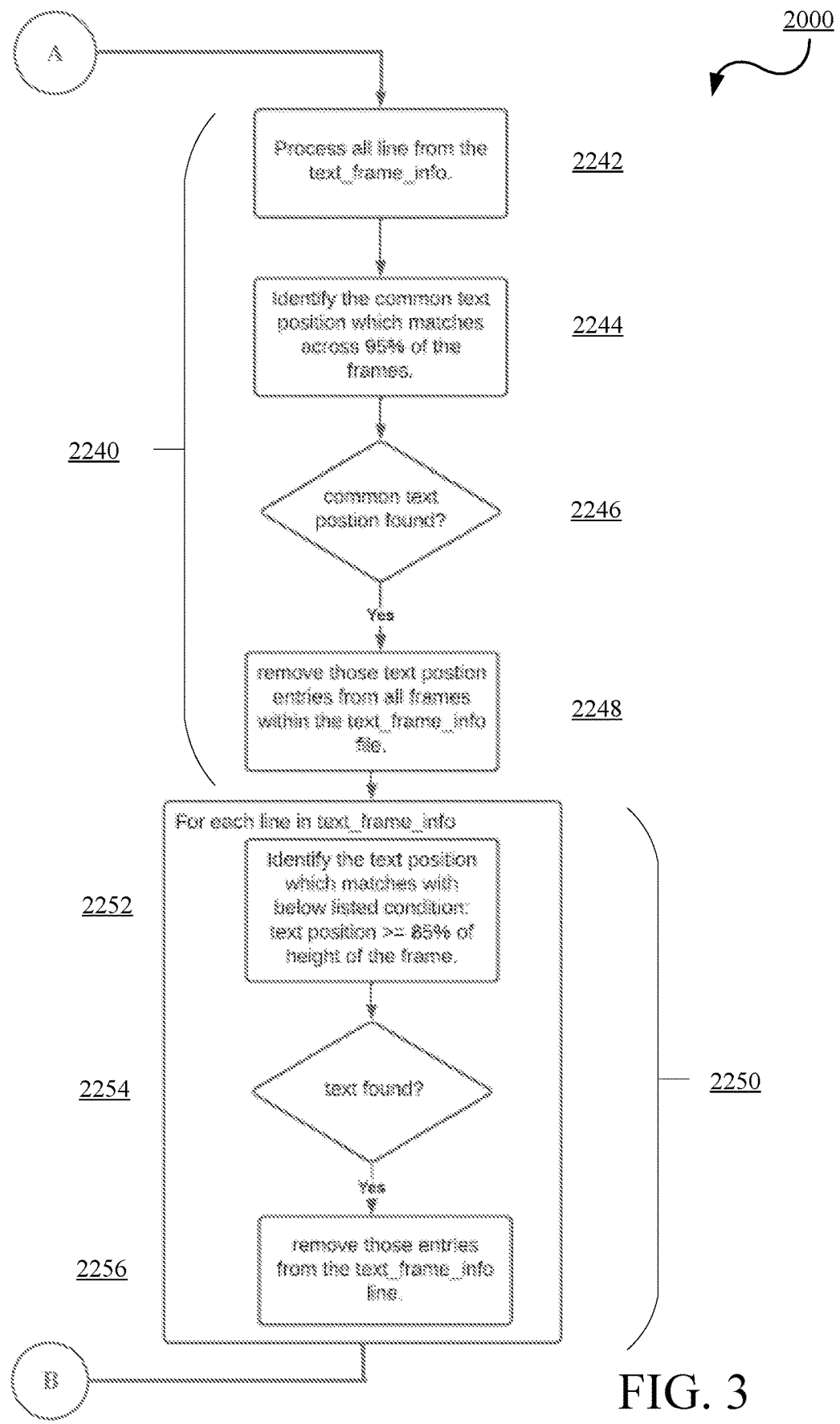
Figure 4:
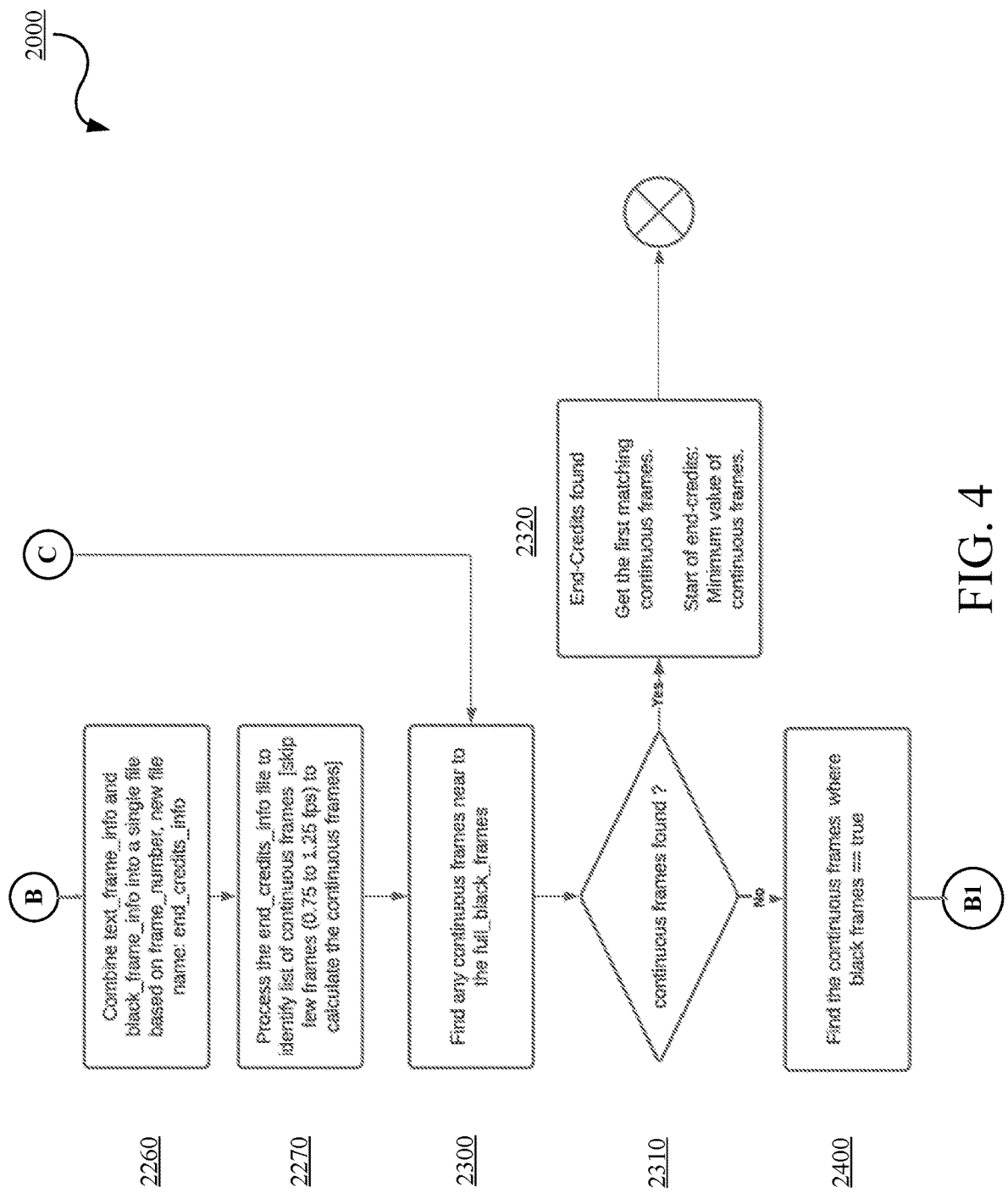
Figure 5:
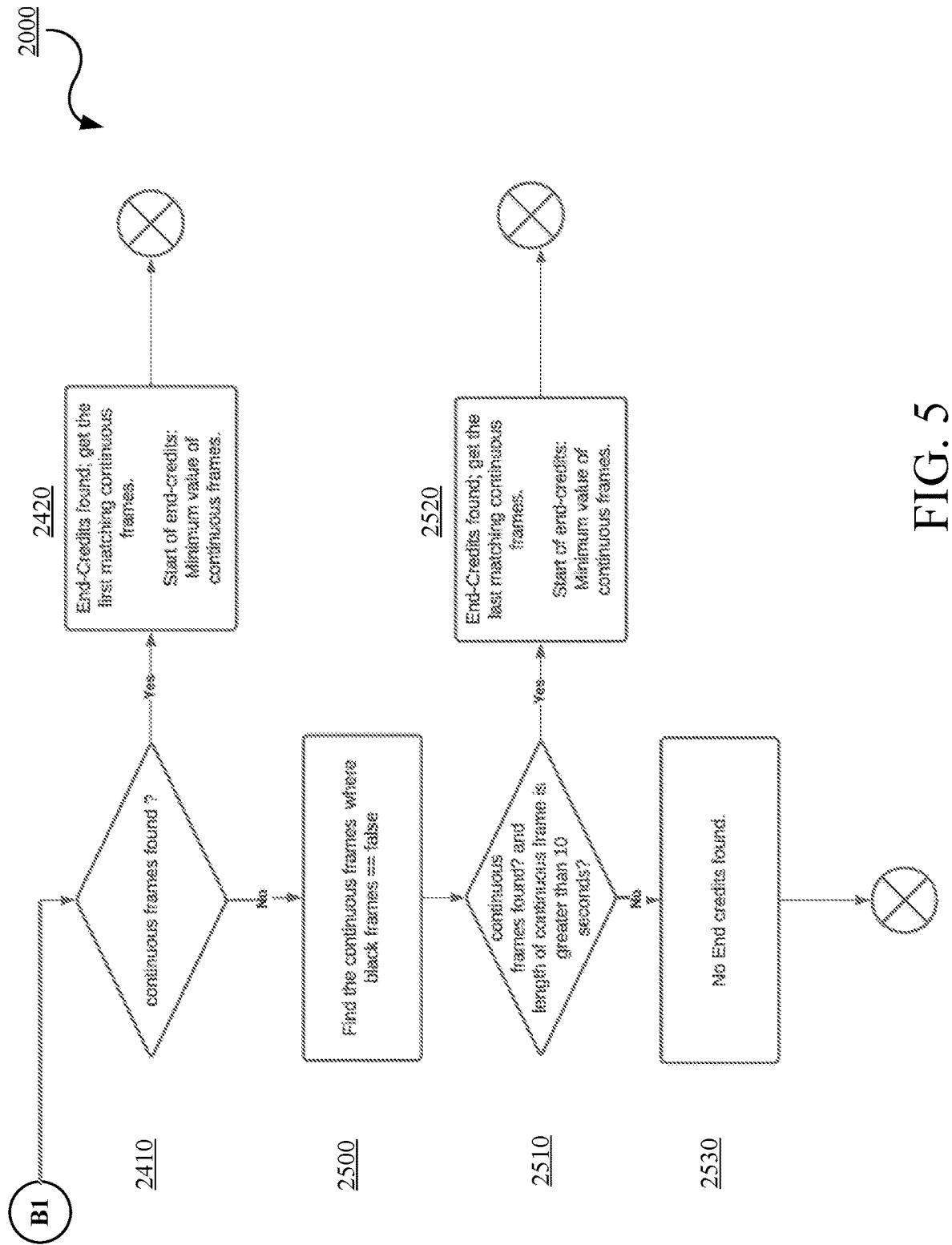

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices, and systems for automated determination of video end credits. In implementations, a video end credits determination system can combine results from multiple video end credits processing techniques to generate a video end credits tag for a video that is statistically more accurate than any one of the video end credits tags generated by the video end credits processing techniques, respectively. In implementations, initially, a training data set of video end credits tags for videos can be used to train the video end credits determination system. In this instance, a tag being a time or location in a video of the video end credits. The videos associated with the training data set can be processed by the multiple video end credits processing techniques. The results from the video end credits processing techniques can be combined using a variety of techniques to generate video end credits tags. The video end credits tags from the combinations are compared against the training data set of video end credits tags. A scoring algorithm is applied against the comparisons to generate a score for each combination. Statistics were generated based on the scores, number of videos successfully tagged, number of tags within one second, median and average time that tags were early and late, and other factors. An optimal combination can be determined based on the statistics and other factors, as appropriate. In implementations, the optimal combination can be automatically updated based on subsequent tagged videos and statistics. In implementations, the video end credits determination system is a machine learning system.

In implementations, the multiple video end credits processing techniques can include techniques which can automatically analyze video contents, perform text detection, and/or perform audio fingerprinting. In implementations, the multiple video end credits processing techniques can be machine learning techniques which can analyze video contents, perform text detection, and/or perform audio fingerprinting. With respect to the training data set, the multiple video end credits processing techniques attempt to determine tags in the same locations as the training data. The multiple video end credits processing techniques are run against every video in the training data.

In implementations of the combinations, a video end credits tag can be determined by calculating an average time from the video end credits processing techniques. In implementations, pairs of close times can be determined from the video end credits processing techniques and processed based on how many pairs are found. In implementations, if no pairs are found, the tag with the latest timestamp can be used (pairs of close times with default to latest). In implementations, if no pairs are found, the tag with the earliest timestamp can be used (pairs of close times with default to earliest). In implementations, if no pairs are found, use a tag generated by a specific technique. This can be done for each technique. In implementations, the combinations can include each possible permutation of the techniques. In implementations, each generated tag can be used. In implementations, tags for a video can be used if the majority of the video end credits processing techniques generated a tag. In implementations, the length of time that two tags can differ and constitute a pair can be varied.

In implementations, the scoring of the tags generated from the video end credits processing techniques and the combinations thereof can include, but is not limited to, weighting late tags preferably over early tags, bounding a maximum time that a tag could be off by, weighting videos according to the length of their end credits, and normalizing the computations in a defined range.

FIG. 1 is a diagram of an example architecture 1000 in accordance with some embodiments of this disclosure. In an implementation, the architecture 1000 can include user(s) 1100 who are using user device(s) 1200 to view video content provided by a service provider system 1300 and content providers 1400. The architecture 1000 and the components therein are illustrative and may include additional, fewer or different devices, entities and the like which may be similarly or differently architected without departing from the scope of the specification and claims herein. Moreover, the illustrated devices may perform other functions without departing from the scope of the specification and claims herein.

The user device(s) 1200 can be, but is not limited to, streaming device(s), mobile device(s), laptops, smart television(s), set-top box(es), personal computers (PCs), cellular telephone(s), Internet Protocol (IP) device(s), computer(s), desktop computer(s), handheld computer(s), PDA(s), personal media device(s), notebook(s), notepad(s), phablet(s), and the like. The user device(s) 1200 may include applications such as, but not limited to, a mail application, a web browser application, an IP telephony application, an IP video application, and the like.

The service provider system 1300 can provide connectivity and content to the user device(s) 1200. The service provider system 1300 can include, but is not limited to, video on-demand (VOD) assets 1500, a transcoder 1600, and a video end credits determination system 1700. In implementations, the transcoder 1600 and the video end credits determination system 1700 can be an integrated server or element. The service provider system 1300 is illustrative and may include additional, fewer, or different devices, entities, and the like which may be similarly or differently architected without departing from the scope of the specification and claims herein.

The video on-demand (VOD) assets 1500 can include videos for, but is not limited to, episodic shows, movies, series, and the like.

The transcoder 1600 can receive the content from the content provider 1400 and the video assets 1500 and perform format changes and perform like processes which are known to one of skill in the art.

The video end credits determination system 1700 can include, but is not limited to, tag processor 1 1712, tag processor 2 1714, tag processor 3 1716, . . . , tag processor N 1718, a tag database 1720, a tag determination and scoring module and/or a tag-generation scoring system and/or unit 1730, and a next episode processing unit 1740. In implementations, the tag processor 1 1712, the tag processor 2 1714, the tag processor 3 1716, . . . , the tag processor N 1718, the tag determination and scoring module 1730, and the next episode processing unit 1740 can be an integrated server or element.

In implementations, the tag processor 1 1712, the tag processor 2 1714, the tag processor 3 1716, . . . , and the tag processor N 1718 can implement automated video end credits techniques. In implementations, one of the tag processor 1 1712, the tag processor 2 1714, the tag processor 3 1716, . . . , and the tag processor N 1718 can be an entry point for manual tags for training data sets. For and/or during the training, each of the tag processor 1 1712, the tag processor 2 1714, the tag processor 3 1716, . . . , and the tag processor N 1718 are run against each video in the training data set. In implementations, for and/or during training of the video end credits determination system 1700, the tag determination and scoring module 1730 can determine which combination of tag results or results from the automated video end credits techniques is optimal for detection of the video end credits.

Figure 6:
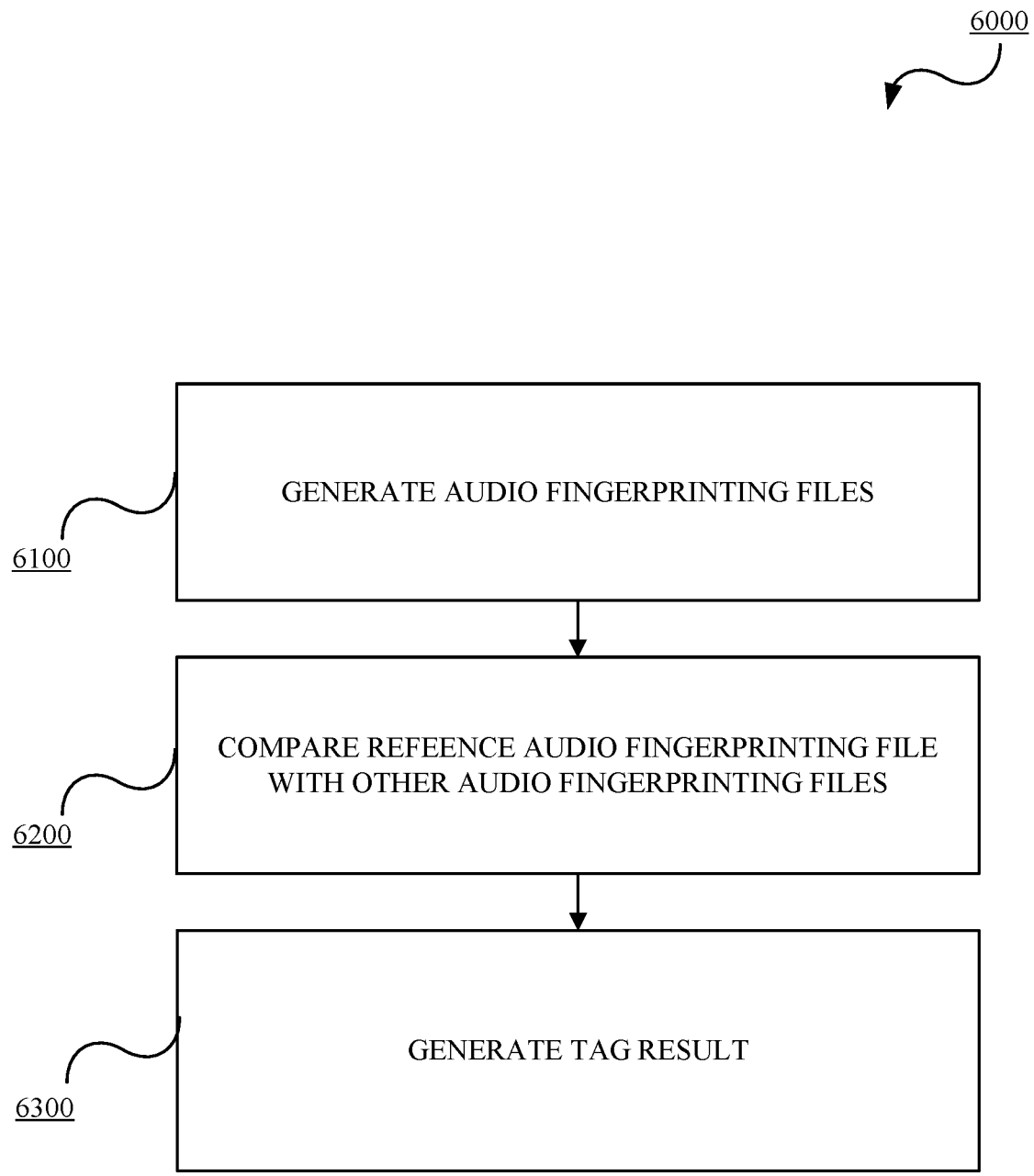
FIG. 6 is a flow diagram of an example tag determination process in accordance with some embodiments of this disclosure.

In implementations, the automated video end credits techniques can include, but is not limited to, a convolutional neural network (CNN) method trained to detect a video end credits location using video and image processing techniques and generate a tag result as described with respect to FIGS. 2-5, a black screen and text engine, a commercial engine such as AWS Rekognition for tag result generation, and an audio fingerprinting method as described with respect to FIG. 6, which performs audio searches across a library of audios, identifies matching events between the video files, and classifies the events to detect the video end credits.

Each of the automated video end credits techniques attempt to create tag results in the same locations as the training data. The automated video end credits techniques are run against every video that was used in the training data. In implementations, the tag results from the video end credits techniques can be combined in multiple ways for each video to determine the one or more automated video end credits techniques that optimize determination and accuracy of the tag result. Each such combination results in a single tag for each video.

In implementations, one combination of the video end credits techniques determines an average value of the tag results from the video end credits techniques to determine the tag result.

In implementations, another combination determines if there are pairs of close times, where a pair is two tag results whose timestamps are within a defined time range. In implementations, the defined time range is variable and configurable. In this combination implementation, each possible pair is determined. If there are no pairs, the output is null. If there is only one pair, then the average of that pair is the tag result. If every tag result is in a pair with every other tag result, then the average of the tag results is the tag result. If there are multiple pairs, consider each pair to be a single tag result whose value is the average of the pair, and recursively re-evaluate the averaged pairs as if they were tag results created by a video end credits technique.

In implementations, another combination determines if there are pairs of close times but if no pairs are found, then the tag result with the latest timestamp is set as the tag result.

In implementations, another combination determines if there are pairs of close times but if no pairs are found, then the tag result with the earliest timestamp is set as the tag result.

In implementations, another combination determines if there are pairs of close times but if no pairs are found, then the tag result generated by a defined video end credits technique is used as the tag result. In implementations, this can be repeated for each video end credits technique.

In implementations, one or more variations can be applied to each of the above combinations. In implementations, one or more permutations of the video end credits techniques can be used for one or more of the above combinations. In a non-limiting example, tag results from the tag processor 1 1712, the tag processor 2 1714, the tag processor 3 1716, . . . , and the tag processor N 1718 can be used in permutation, tag results from the tag processor 1 1712 and the tag processor 2 1714 can be used in another permutation, tag results from the tag processor 1 1712 and the tag processor 3 1716 can be used in another permutation, and so on.

One or more of the video end credits techniques may not successfully tag every video. One or more of the video end credits techniques may determine that the contents being searched for do not exist in the video. Variations may be used in determining which tags to use. In implementations, a liberal tag result selection dictates using every tag result. In implementations, a conservative tag result selection dictates using a null result unless the majority of tag results are of the same type as described herein below with respect to Table 1.

After determination and selection of the tag results, the video end credits determination system 1700 and/or the tag determination and scoring module 1730 can compare the selected tag results against the training tags. A scoring metric can be applied to the comparisons which weights late tag results to be preferable to early tag results, bounds the maximum time that a tag result can be off by, and weights videos according to the length of their video end credits. The scoring metric can employ a normalization factor.

In implementations, the tag determination and scoring module 1730 may use a three stage process for scoring a tag result with respect to the automated video end credits techniques. The scoring is done by comparing a tag result with respect to the training tags in the training data set. In a first stage, a tag result is scored for a single video processed using an automated video end credits technique. In a second stage, multiple tag results are scored for multiple videos processed using the automated video end credits technique. In a third stage, multiple tag results are scored for multiple videos processed using multiple automated video end credits technique. In the first stage, each automated video end credits technique is run against each video. A score is generated for each automated video end credits technique against each video. In the second stage, a second score is generated from all the scores per each automated video end credits technique based on weighting some videos higher than other videos. In the third stage, a final score can be generated by combining results from multiple automated video end credits technique per video.

Normalization is applied to the scores, where the score is normalized between a maximum normalization value and a minimum normalization value. For example, the maximum normalization value can be +10 and the minimum normalization value can be −10. A value of 0 can represent "no harm" scenario. That is, no skipping or auto-playing but no negative customer impact. This normalization remains the same no matter how many factors are added or removed and no matter what the weights are. The normalization is applied to all three stages.

In implementations of the first stage of the scoring process, the scoring accounts for multiple factors, including but not limited to, the accuracy of the tag, the cost in performing the tag determination, the amount of time taken to perform the tag determination, and whether multiple videos are required. The first stage can use weights for the various factors. In implementations, the weights are adjustable. In a non-limiting example, the weight for how early a tag for the video end credit is can range from a maximum weight to a minimum weight such as, for example, +5 to −10. In a non-limiting example, the weight for how late a tag for the video end credit is can range from a maximum weight to a minimum weight such as, for example, +5 to −2. In a non-limiting example, the weight for costs can range from a maximum weight to a minimum weight such as, for example, 0 to −2. In a non-limiting example, the weight for how tag processing time (not including pre-processing steps common to all techniques) can range from a maximum weight to a minimum weight such as, for example, 0 to −2. In a non-limiting example, the weight for how many videos are needed can range from a maximum weight to a minimum weight such as, for example, 2 (only one video needed) to 0 (if multiple videos are required). As shown in the non-limiting examples, accuracy scores can be both positive and negative because accurate tagging has a positive customer impact while inaccurate tagging has a negative customer impact. Moreover, scores for cost and time do not go above 0 since a positive cost or time is not possible. This is in line with the view that a score of 0 is a neutral "no harm" value (e.g., the equivalent of not doing anything).

A factor can be associated with an outer bounds to reflect the point that one bad result is no worse than another different bad result. For example, showing the "next episode" 10 seconds after the video end credits has already started is not significantly worse than showing it 15 or 20 seconds late. That is, after about 10 seconds, everything is equally bad. In these instances, the scoring factor is not affected. In implementations, the "how early the start of the tag is" has an outer bounds of 10 seconds, the "how late the start of the tag is" has an outer bounds of 10 seconds, the cost in money has an outer bounds of $20 per 1 hour, and the time taken has an outer bounds of 10 minutes per 1 hour. In this instance, the cost and time taken are based on a 1-hour video runtime. This does not include commercials (it is not the duration when aired on live TV). Note that the time taken and cost factors do not include pre-processing steps, such as clipping and formatting the video files and only include actions that are specific to each technique.

In implementations, a video end credits technique can determine that a video has no video end credits and a value of 0 (zero) is therefore placed in the tag database 1720. If the video end credits technique is correct (as compared against manual tag data), the video end credits technique is awarded a maximum score for that factor. If the video end credits technique is incorrect, then no harm is done to the customer (the customer is simply not shown the "next episode" button), and the video end credits technique is awarded a score of 0 for that factor.

In implementations, a video end credits technique may be unable to determine the video end credits. In this instance, a null is stored in the tag database 1720. the video end credits technique is awarded a score of 0 for this factor as no harm is done to the customer (the customer is simply not shown the "next episode" button).

In implementations, a video end credits technique can determine that the video end credits run through the end of the video. In this instance, a value of −1 is stored in the tag database 1720. If the video end credits technique is correct (as compared against manual tag data), the video end credits technique is awarded a maximum score for that factor. If the video end credits technique is incorrect, then there is harm done to the customer (the next episode will autoplay, possibly skipping over desired content). In this instance, the video end credits technique is penalized with the maximum negative score for this factor.

For the first stage, each factor is determined independently for each video processed by a video end credits technique, where a score is calculated between the upper and lower weights. The scores are then added together and normalized in the normalization range between the maximum normalization value and the minimum normalization value. For example, the maximum normalization value and the minimum normalization value can 10 and −10, respectively. In a non-limiting example, if the maximum of all the weights is 20 and all the scores add up to 20 (i.e., 100% of the maximum score), then the normalized score is the maximum normalization value, e.g., 10. In a non-limiting example, if the maximum of all the weights is 20 and the scores add up to 5 (25% of the maximum score), then the value for the normalized score is 2.5. In a non-limiting example, if the minimum of all the weights is −24 and the scores add up to −12 (50% of the min score), then the value for the normalized score is −5.

In implementations of the second stage of the scoring process, after a video end credits technique has been run against all the videos (in a training set) and a score has been generated for each one, the effectiveness of the video end credits technique is evaluated by combining all the scores into a new score. This second stage or combined scoring accounts for the following factors: the length of the video end credits and the number of available episodes in the series. As before, the combined score is normalized and the weights are configurable. In a non-limiting example, for the length of the video end credits, a weight of 1 is assigned if the length is 10 or less, a weight of 2 is assigned if the length is between 10 and 20 seconds, a weight of 3 is assigned if the length is between 20 and 30 seconds, and a weight of 4 is assigned if the length is 30 seconds or greater. In a non-limiting example, for the number of available episodes in a series, a weight of 1 is assigned if the number of episodes is 1, a weight of 2 is assigned if the number of episodes is between 2-5, and a weight of 3 is assigned if the number of episodes is 6 or greater.

For the second stage, the weight determines how important each video is. In a non-limiting example, for a single factor, assume one video receives a weight of 4 and a second video receives a weight of 1. In this instance, the first video is 4 times as important as the second video. Because all the weights for each of the factors are added together, the weights of each factor relative to each other also matters. For example, if one factor has a maximum score of 5 and a second factor as a maximum score of 10, the second factor is twice as important as the first factor.

In implementations of the third stage of the scoring process, the overall effectiveness of all video end credits techniques can be evaluated by combining results from the multiple video end credits techniques. Third stage scores are generated per video, using a combination of results from the multiple video end credits techniques as shown in Table 1. Note that a "non-0 tag" means that there was a video end credits, a "0 tag" means there was no video end credits, and "no tags" means that the video end credits technique was unable to determine if there was a video end credits and therefore did not create a tag. Also, "averaging" refers to averaging the accuracy values of the start of the tags. The values for the cost in money and the time taken in minutes are always added together (even if a video end credits technique was unable to come up with a tag).

After a score is determined for each video, the second stage is re-run to determine a combined score for all the videos. As noted for the third stage, multiple algorithms are combined, in multiple ways. Each combination of algorithms can be considered an algorithm (referred to as an "ensemble algorithm"). Once an ensemble algorithm constructed (for example, combining all 4 individual algorithms described herein and using the 'average-start-times' technique), the ensemble algorithm can be run against each video (stage 1) and then create a score that encompasses all the videos (stage 2).

TABLE 1 if all techniques create non-0 tags:
   the tags of all techniques are averaged
else if all techniques create 0 tags:
   the tags of all techniques are averaged (since they are all the same, this is the equivalent of using the accuracy score for a single technique)
else if all techniques create no tags:
   the accuracy score is 0
else if techniques are a combination of non-0 tags and 0 tags:
   if there are an even number of each:
     the accuracy score is 0 (the equivalent of no tags)
   else if the majority are non-0:
     the non-0 tags are averaged
   else (the majority are 0):
     the non-0 tags are thrown out, and a tag of 0 is used
else if techniques are a combination of non-0 tags and no tags:
   the no-tags are thrown out, and the non-0 tags are averaged
else if techniques are a combination of 0 tags and no tags:
   the no-tags are thrown out, and a tag of 0 is used
else (techniques are a combination of non-0 tags, 0 tags, and no tags):
   if, after throwing out the no-tags, there are an even number of non-0 and 0 tags:
     the accuracy score is 0 (the equivalent of no tags)
   else if, after throwing out the no-tags, the majority are non-0:
     the non-0 tags are averaged
   else (after throwing out the no-tags, the majority are 0):
     the non-0 tags are thrown out, and a tag of 0 is used The video end credits determination system 1700 and/or the tag determination and scoring module 1730 can analyze and determine statistics for the scoring and factors described herein to select an optimal combination of video end credits techniques to process videos to determine video end credits tags. In implementations, the statistics can include, but is not limited to, number of negative scores, number of videos successfully tagged, number of tags within one second (this refers to the number of tags that were within one second of the manual tag in the training data), and the median and average time that tags were early and late.

The score shows the overall accuracy of a video end credits technique. The score is normalized, where a negative value means that the customer was negatively impacted, a positive value means that the customer benefitted, and a value of 0 means that there was no customer impact.

For a video end credits technique and/or combination, the number of videos successfully tagged reflects the fact that not each video end credits technique is able to process every video. For some video end credits techniques, this meant that a video end credit may have been found but the confidence was not high enough. For other video end credits techniques, there weren't enough videos in a series or a season to perform the tag detection process. Note that this is different than when the video end credits techniques determined that there was no video end credit in the video. In other words, finding no video end credits is considered to be a successful tag result.

For a video end credits technique and/or combination, the percentage of negative-score videos reflects the premise that presenting a next episode button or playing the next episode automatically does not harm the customers. For instance, tagging a video too late (i.e., determining that the video end credit begins later than it actually does), while not great, is still better than what the customers have today. Therefore, late tag results do not result in a negative score. Likewise, being unable to determine whether there is a video credits or determining that there is no video end credits results in a customer experience that is exactly the same as what currently exists. Therefore, these scenarios resulted in a score of 0. A negative score was only given if a tag result was more than a defined number of seconds early, where the defined number of seconds is a value that significantly impacts the customer. In implementations, the defined number of seconds can be 4 seconds.

The video end credits determination system 1700 and/or the tag determination and scoring module 1730 can use the statistics and one or more priority factors or weights (referred to as a tag strategy) to determine the optimal one or more video end credits techniques that should be used by the video end credits determination system 1700 to process videos. The one or more priority factors or weights can emphasize one or more of maximizing how many processed videos result in tag results, accuracy, potential harm to consumers, and/or costs. For instance, to maximize how many processed videos result in tag results, the combination and/or selection strategy for using every possible tag result can be weighted more. For instance, to maximize accuracy, the combination and/or selection strategy such as one of the pairs-of-close-times results can be weighted more to provide low median or average earliness/lateness values. For instance, to prioritize no harm to consumers, the combination and/or selection strategy that results in 0 negative scores can be weighted more. In implementations, combinations of the one or more priority factors can be used. In implementations, the one or more priority factors or weights can be configurable.

In a non-limiting example, a tag strategy was set using a combination of maximizing how many processed videos result in tag results and prioritizing no harm to consumers. The combination and/or selection strategy referred to as pairs of close times with default to latest while using all of the described automated video end credits techniques resulted in a 79% tag rate with 0% negative scores. In a further non-limiting example, the tag strategy was modified to exclude the AWS Rekognition video end credits technique due to cost. The modified tag strategy resulted in a 65% tag rate with 0% negatives scores.

During operation, a user can select a video for viewing. The trained video end credits determination system 1700 and/or the tag determination and scoring module 1730 can generate a tag for the video using the optimal video end credits techniques. The next episode processing unit 1740 can insert the next episode button or automatically play the next episode based on the tag determined by the tag determination and scoring module 1730.

FIGS. 2-5 are a flow diagram of an example tag determination process or automated video end credits technique (collectively "method 2000" as appropriate) in accordance with some embodiments of this disclosure. In implementations, the automated video end credits technique is a convolutional neural network (CNN) and/or machine learning technique. As described herein, the method 2000 can determine presence of unique features of video end credits such as, but not limited to, partial black screen, full black screen, text in a frame (image), identify the position of channel logo in a frame (image), and text position of the subtitle in a frame (image) to accurately identify the video end credits position within a video.

A video is a sequence of images and/or frames stored in a single file along with corresponding audio. A video can be measured as frame per second (FPS). For example, if a video is measured as 30 FPS, then the video contains 30 frames and/or images stored in sequence for one second of the video. Each frame and/or image is measured as pixels. For example, if a frame and/or image is measured as 480×290 pixels then the frame's width is equal to 480 pixels, and the frame's height is equal to 290 pixels. To identify the video end credits position, the video is converted into frames using standard libraries such as Ffmpeg or moviePy. The video conversion is also applicable to other automated video end credits techniques.

The method 2000 can process the image(s) to determine one or features of the image(s). These can include, but are not limited to, partial black screen (where most of the episodic videos have video end credits shown in a black screen), full black screen (where most of the episodic videos have a full black screen before the start of the video end credits), text in a frame and/image (where the video end credits are text in the image and/or frame, identify position of channel logo in a frame and/or image (noting that a few channel logos are in text format), identify text position of the subtitle in a frame and/or image (where most of the providers will add subtitles in English for non-English scenes), identify the vertical spacing between all texts within a frame, and/or identify number of words in a line of text. In implementations, the method 2000 can be implemented using open-source libraries such as python-open-cv and python-num-py, and use CNN models.

As noted above, at 2100, the method 2000 can convert the videos to image and/or frames (collectively "frame").

At 2200, the method 2000 can identify a text position via a neural network model. At 2202, the method 2000 can store the text position with a frame number into a file (such as text_frame_info). This is done for each frame in the video.

At 2210, the method 2000 can identify a partial black screen by calculating a total number of black pixels and determine a black pixels percentage by comparing the total number of black pixels against the total number of pixels. At 2212, a frame is considered a partial black screen if the black pixels percentage is greater than or equal to a defined threshold. In implementations, the defined threshold is 85%. At 2214, method 2000 can store the frame number if the frame is a partial black screen in the text file (such as black_frame_info).

At 2220, the method 2000 can identify a full black screen (or full same color screen) by calculating the standard deviation of pixel value of all pixels. At 2222, a frame is considered a full black screen if the standard deviation is lesser than or equal to a defined value. In implementations, the defined value is 0.3. At 2224, method 2000 can store the frame number if the frame is a full black screen in the text file (such as full_black_frame_info).

At 2230, the method 2000 can identify a continuous black color (or continuous same color) by calculating the standard deviation of 20% of top, right, left, and bottom pixels. At 2232, a frame is considered a partial black screen if the standard deviation is lesser than or equal to a defined value. In implementations, the defined value is 0.3. At 2234, method 2000 can store the frame number if the frame is a partial black screen in the text file (such as black_frame_info).

At 2240, the method 2000 can identify and remove a content provider or similar logo. This can be done by identifying common text position across all frames. At 2242, the method 2000 can process all lines (i.e., lines having an identified text position) from the text file (i.e., text_frame_info). At, 2244, the method can identify a common text position which matches across a defined percentage of the frames. In implementations, the defined percentage is 95%. At 2246, the method 2000 can determine if a common text position exists across the defined percentage of frames. At 2248, the method 2000 can remove those text position entries from all frames within the text file (i.e., text_frame_info).

At 2250, the method 2000 can identify and remove subtitle text position. At 2252, the method 2000 can, for each line in text file (i.e., text_frame_info), identify text positions which are equal or greater than a predefined height percentage of the frame. In implementations, the predefined height percentage is 85%. At 2254, the method 2000 can determine text positions exist at the predefined height percentage. At 2256, the method 2000 can remove those text position entries for the appropriate line within the text file (i.e., text_frame_info).

At 2260, the method 2000 can combine the text position information and the partial black screen information (i.e., the text_frame_info and the black_frame_info) to generate and end credits file based on frame number (i.e., end_credits_info).

At 2270, the method 2000 can process the end credits file to identify list of continuous frames. In implementations, a defined number of frames can be skipped as there may be some black frames between the video end credits. In implementations, the defined number of frames can be based on 0.75 to 1.25 fps.

The method 2000 can then determine whether there are end credits located before the full black screen. At 2300, the method 2000 can look for any continuous frames near the full black frames. This can be done by using the information from the text file (i.e., full black_frame_info). At 2310, the method 2000 can determine whether any continuous frames were found near the full black frames. In implementations, the method 2000 can identify all possible continuous frames with a length greater than a defined length and it is a full black screen. In implementations, the defined length is 10 seconds. At 2320, if continuous frames were found near the full black frames, then get the minimum value from the set of continuous frame, convert the frame number into a time based on FPS, and return the time as the end credits start-time. The method 2000 stops.

If no continuous frames were found near the full black frames, then the method 2000 can determine whether there are end credits shown in a black screen. At 2400, the method 2000 can identify all possible the continuous frames with the length greater than the defined length and it is a full black screen. At 2410, the method 2000 can determine whether a set of continuous frames were found. At 2420, if a set of continuous frames were found, then get the minimum value from the set of continuous frame, convert the frame number into time based on FPS, and return the time as end credits start-time. The method 2000 stops.

If a set of continuous frames were not found, then the method 2000 can determine whether there are end credits which are shown behind or on an image or a video. That is, the end credits are shown during a dynamic (video) or static (image) scene. At 2500, the method 2000 can identify all possible the continuous frames with the length greater than the defined length. At 2510, the method 2000 can determine whether a set of continuous frames were found. At 2520, if a set of continuous frames were found, then get the last matching set, get the minimum value from the set of continuous frames, convert the frame number into time based on FPS, and return the time as end credits start-time. The method 2000 stops. If no continuous frames were found, at 2530, then no end credits were found. The method 2000 stops.

FIG. 6 is a flow diagram of an example tag determination process or automated video end credits technique (collectively "method 6000" as appropriate) in accordance with some embodiments of this disclosure. In implementations, the automated video end credits technique is audio fingerprinting. The method 6000 can perform audio searches across a library of audios. Matching events between video files will be identified using the audio fingerprinting technique and then these events can be classified to detect the video end credits.

At 6100, the method 6000 can generate an audio fingerprint file for each video. The audio fingerprint is generated for a defined event. This can relate to, for example, a defined amount of time at the end of the video. To generate the audio fingerprint file for a video, the method 6000 can read or obtain an audio stream associated with the video. For example, an audio stream can be a .mp4 file. The pulse code modulation (PCM) data of one or more channels associated with the audio stream is then obtained. The spectrogram of the audio is obtained by application of a Non-Equispaced Fast Fourier Transform. In the frequency spectrum, the local maximas and/or peaks, their time differences, and the corresponding time index are determined. A unique SHA256 hash for the maxima and the time delta between the maxima are generated. A list of fingerprints and the time of occurrence in the spectrogram is created. The time index can be used to identify the position of the event during the hash matching step as described herein.

At 6200, the method 6000 can use one of the audio fingerprinting files as a reference file. The reference file and the remaining files are divided into defined time portion, chunk, slice, or segment files. In implementations, the defined time portion is one second.

At 6300, for each audio fingerprinting file, the method 6000 can match the reference segment files against the segment files of the remaining files. The location of matching events can be captured when fingerprints match between the reference segment file and the segment file being processed. In an illustrative example, a first fingerprint file can have ["hash1", "time1"], ["hash2", "time2"], . . . etc., and a second fingerprint file can have ["hash3", "time1"], ["hash1", "time2"], . . . etc. That is, the first fingerprint file and the second fingerprint file have a same hash value at time1 and time2, respectively. A defined match threshold can be used be to control the sensitivity of the audio fingerprint matching. The defined match threshold can indicate a minimum percentage of audio fingerprints that need to match between two audio files to be considered a match. The method can discard matches below the defined match threshold to avoid spurious matches that could just occur by chance. In implementations, the defined match threshold can be used when comparing audio fingerprints between an unknown audio clip and a reference audio clip to determine if they contain the same audio content.

At 6400, the method 6000 can generate a tag result based on the length of the match and separation of the matching events.

Figure 7:
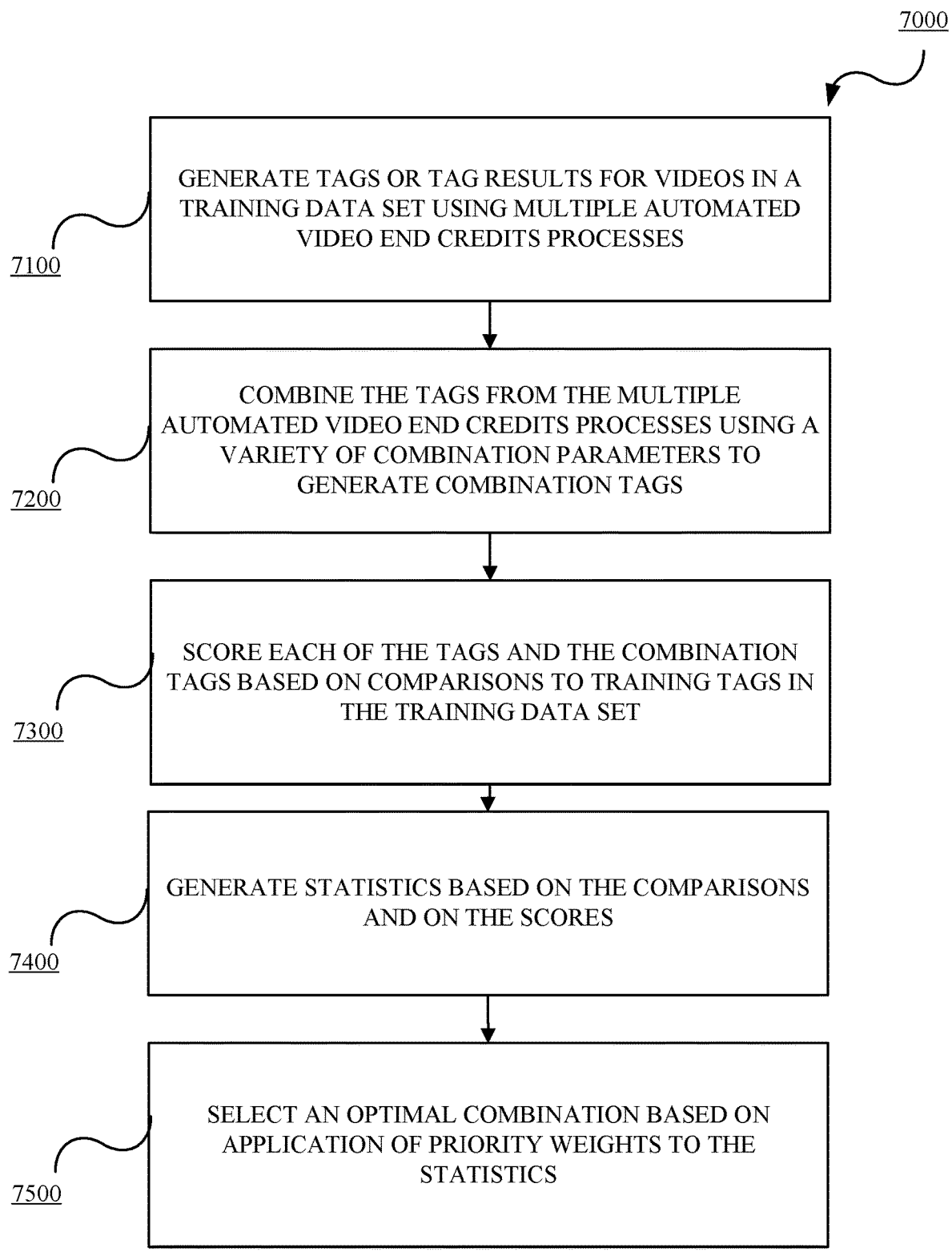
FIG. 7 is a flowchart of an example method for automatically determining video end credits in accordance with embodiments of this disclosure.

FIG. 7 is a flowchart of an example method 7000 for automated video end credits tag determination in accordance with embodiments of this disclosure. The method 7000 includes: generating 7100 tags or tag results for videos in a training data set using multiple automated video end credits processes; combining 7200 the tags from the multiple automated video end credits processes using a variety of combination parameters to generate combination tags; scoring 7300 each of the tags and the combination tags based on comparisons to training tags in the training data set; generating 7400 statistics based on the comparisons and on the scores; and selecting 7500 an optimal combination based on application of priority weights to the statistics. Each of the steps being automatically being done by the system. For example, the method 7000 may be implemented, as applicable and appropriate, by the service provider system 1300, the video on-demand (VOD) assets 1500, the transcoder 1600, the video end credits determination system 1700, the tag processor 1 1712, the tag processor 2 1714, the tag processor 3 1716, . . . , the tag processor N 1718, the tag database 1720, the tag determination and scoring module 1730, and the next episode processing unit 1740, a device 8000, a processor 8100, a memory/storage 8200, a communication interface 8300, and applications 8400, for example.

The method 7000 includes generating 7100 tags or tag results for videos in a training data set using multiple automated video end credits processes. The training data set includes a set of videos and manually determined tags, which are referred to as training tags for purposes of clarity. The system can include multiple automated video end credits techniques or processors. Each of the videos in the training data set is processed by each of the multiple automated video end credits techniques or processors to generate a tag.

The method 7000 includes combining 7200 the tags from the multiple automated video end credits processes using a variety of combination parameters to generate combination tags. For each video, the tags from the multiple automated video end credits techniques or processors are combined in a number of ways or using a variety of combination parameters as described herein. Each of the combinations results in a tag, which is referred to herein as a combination tag for purposes of clarity.

The method 7000 includes scoring 7300 each of the tags and the combination tags based on comparisons to training tags in the training data set. A score is determined for each of the tags and the combination tags based on a comparison with the training tags for that video. The score is based on a variety of factors as described herein. Each of the factors can have a value and each value can be weighted. The sum of the values for the factors can be normalized. The factors and weights are configurable based on system provider and user requirements and needs.

The method 7000 includes generating 7400 statistics based on the comparisons and on the scores. For each of the automated video end credits techniques or processors and combinations thereof, statistics were determined across all the videos in the training data set.

The method 7000 includes selecting 7500 an optimal combination based on application of priority weights to the statistics. Priority factors or weights are applied against the statistics to emphasize one or more of the statistics versus other statistics as described herein. The priority factors or weights are configurable. In implementations, the selected combination can be updated during operation of the system. In implementations, certain videos can be designated as training videos and processed as described herein to update the optimal combination. During non-training operation or standard operation, the selected combination can be used to automatically determine a tag for a user selected video for insertion or placement of a next episode button or for automatically starting the next episode.

Figure 8:
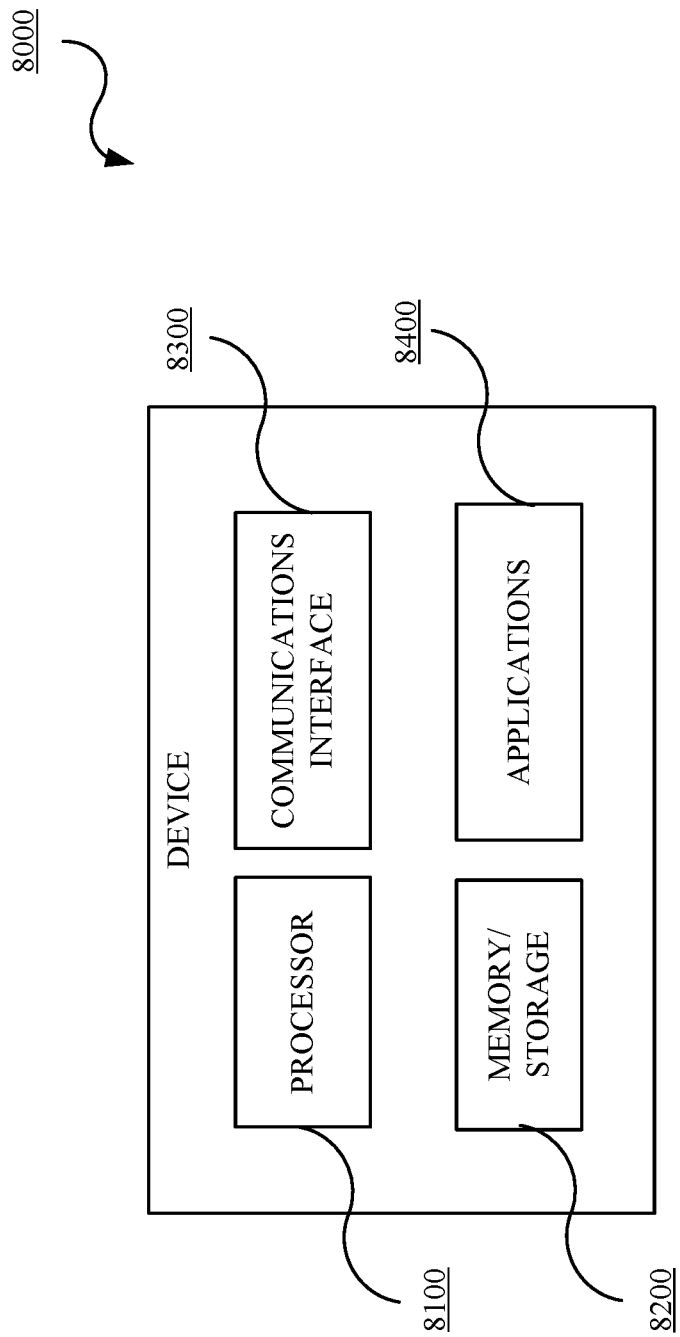
FIG. 8 is a block diagram of an example device in accordance with some embodiments of this disclosure.

FIG. 8 is a block diagram of an example of a device 8000 in accordance with embodiments of this disclosure. The device 8000 may include, but is not limited to, a processor 8100, a memory/storage 8200, a communication interface 8300, and applications 8400. The device 8000 may include or implement, for example, the service provider system 1300, the video on-demand (VOD) assets 1500, the transcoder 1600, the video end credits determination system 1700, the tag processor 1 1712, the tag processor 2 1714, the tag processor 3 1716, . . . , the tag processor N 1718, the tag database 1720, the tag determination and scoring module 1730, and the next episode processing unit 1740, for example. In implementations, the memory/storage 8200 may store the tag(s), priority factor, statistics, tag strategy, and like information. In implementations, the applications 3400 can include, for example, automated video end credits applications, scoring application, and the like. The techniques or methods described herein may be stored in the memory/storage 8200 and executed by the processor 8100 in cooperation with the memory/storage 8200, the communications interface 8300, and applications 8400, as appropriate. The device 8000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Described herein are methods for automated video end credits determination. In implementations, a method includes generating, by multiple automated video end credits processors, tags for videos in a training data set. A tag-generation scoring system and/or unit combines the tags from the multiple automated video end credits processors using combination parameters to generate combination tags, wherein combinations are done per video. The tag-generation scoring system and/or unit scores each of the tags and the combination tags based on comparisons to training tags in the training data set for the videos to generate scores, where a score reflects accuracy of a tag. The tag-generation scoring system and/or unit generates statistics based on the comparisons and on the scores across all of the videos and selects an optimal combination of the multiple automated video end credits processors based on application of priority weights to the statistics.

In implementations, the method further includes generating, by the optimal combination of the multiple automated video end credits processors, a tag for a user selected video and inserting, by a video end credits determination system, a next episode button at the tag generated for the user selected video. In implementations, the method further includes generating, by the optimal combination of the multiple automated video end credits processors, a tag for a user selected video, and automatically playing, by a video end credits determination system, a next episode at the tag generated for the user selected video. In implementations, for one of the combination parameters, the combining further includes determining an average value from the tags generated by the multiple automated video end credits processors to generate a combination tag. In implementations, for one of the combination parameters, the combining further includes determining a value from pairs of tags which are within a defined length of time. In implementations, the combining further includes setting the value to a latest tag when no pairs of tags are within the defined length of time. In implementations, the defined length of time is configurable. In implementations, the scoring further includes applying more weight to a late tag in comparison to an early tag. In implementations, the scoring further includes applying weights based on length of video end credits. In implementations, the statistics include number of score with negative values, number of videos successfully tagged, median time that tags were early, median time that tags were late, average time that tags were early, and average time that tags were late.

Described herein are systems for automated video end credits determination. In implementations, a service provider system includes a plurality of automated video end credits processors, each configured to generate a tag for a video to indicate a location of video end credits in the video, and a tag-generation scoring system and/or unit. tag-generation scoring system and/or unit is configured to combine tags from the plurality of automated video end credits processors to generate combination tags, wherein the tags are for training videos and combinations are done on a per video basis, score each of the tags and the combination tags by comparing to training tags associated with the training videos, wherein a score reflects accuracy of a tag, generate statistics based on the comparisons and on the scores across all of the training videos, and determine an optimal combination of the plurality of automated video end credits processors based on application of priority weights to the statistics.

In implementations, the service provider system further including a next episode unit. In implementations, the next episode unit configured to generate a tag for a user selected video using the optimal combination, and insert a next episode button at the tag generated for the user selected video. In implementations, the next episode unit. configured to generate a tag for a user selected video using the optimal combination, and play a next episode at the tag generated for the user selected video. In implementations, a value for a combination tag is generated by determining an average value from the tags generated by the plurality of automated video end credits processors. In implementations, a value for a combination tag is generated from pairs of tags which are within a defined length of time. In implementations, the defined length of time is configurable. In implementations, the tag-generation scoring system and/or unit is further configured to apply more weight to a late tag in comparison to an early tag. In implementations, the tag-generation scoring system and/or unit is further configured to apply weights based on length of video end credits. In implementations, the statistics include number of score with negative values, number of videos successfully tagged, median time that tags were early, median time that tags were late, average time that tags were early, and average time that tags were late.

Described herein are methods for next episode automation in a video. In implementations, a method includes generating, by multiple automated video end credits processors, tags for training videos. A tag-generation scoring system and/or unit generates combination tags from the tags, where combinations are done per training video. The tag-generation scoring system and/or unit generates a score for each of the tags and the combination tags by comparing to training tags for the training videos, where a score reflects accuracy of a tag. The tag-generation scoring system and/or unit generates statistics based on the comparisons and on the scores across all of the training videos, and selects an optimal combination of the multiple automated video end credits processors by applying weights to the statistics. The optimal combination of the multiple automated video end credits processors generates a tag for a user selected video. A video end credits determination system inserts a next episode button at the tag generated for the user selected video.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for automated video end credits determination, the method comprising:
generating, by multiple automated video end credits processors, tags for videos in a training data set;
combining, by a tag-generation scoring system, the tags from the multiple automated video end credits processors using combination parameters to generate combination tags, wherein combinations are done per video;
scoring, by the tag-generation scoring system, each of the tags and the combination tags based on comparisons to training tags in the training data set for the videos to generate scores, wherein a score reflects accuracy of a tag;
generating, by the tag-generation scoring system, statistics based on the comparisons and on the scores across all of the videos; and
selecting, by the tag-generation scoring system, an optimal combination based on application of priority weights to the statistics.

2. The method of claim 1, further comprising:
generating, by the optimal combination, a tag for a user selected video; and
inserting, by a video end credits determination system, a next episode button at the tag generated for the user selected video.

3. The method of claim 1, further comprising:
generating, by the optimal combination, a tag for a user selected video; and
automatically playing, by a video end credits determination system, a next episode at the tag generated for the user selected video.

4. The method of claim 1, wherein for one of the combination parameters, the combining further comprising:
determining an average value from the tags generated by the multiple automated video end credits processors to generate a combination tag.

5. The method of claim 1, wherein for one of the combination parameters, the combining further comprising:
determining a value from pairs of tags which are within a defined length of time.

6. The method of claim 5, the combining further comprising:
setting the value to a latest tag when no pairs of tags are within the defined length of time.

7. The method of claim 5, wherein the defined length of time is configurable.

8. The method of claim 1, the scoring further comprising:
applying more weight to a late tag in comparison to an early tag.

9. The method of claim 8, the scoring further comprising:
applying weights based on length of video end credits.

10. The method of claim 1, wherein the statistics include number of score with negative values, number of videos successfully tagged, median time that tags were early, median time that tags were late, average time that tags were early, and average time that tags were late.

11. A service provider system comprising:
a plurality of automated video end credits processors, each configured to generate a tag for a video to indicate a location of video end credits in the video; and
a tag-generation scoring system configured to:
combine tags from the plurality of automated video end credits processors to generate combination tags, wherein the tags are for training videos and combinations are done on a per video basis;
score each of the tags and the combination tags by comparing to training tags associated with the training videos, wherein a score reflects accuracy of a tag;
generate statistics based on the comparisons and on the scores across all of the training videos; and
determine an optimal combination based on application of priority weights to the statistics.

12. The service provider system of claim 11, further comprising:
a next episode unit configured to:
generate a tag for a user selected video using the optimal combination; and
insert a next episode button at the tag generated for the user selected video.

13. The service provider system of claim 11, further comprising:
a next episode unit configured to:
generate a tag for a user selected video using the optimal combination; and
play a next episode at the tag generated for the user selected video.

14. The service provider system of claim 11, wherein a value for a combination tag is generated by determining an average value from the tags generated by the plurality of automated video end credits processors.

15. The service provider system of claim 11, wherein a value for a combination tag is generated from pairs of tags which are within a defined length of time.

16. The service provider system of claim 15, wherein the defined length of time is configurable.

17. The service provider system of claim 11, wherein the tag-generation scoring system is further configured to apply more weight to a late tag in comparison to an early tag.

18. The service provider system of claim 11, wherein the tag-generation scoring system is further configured to apply weights based on length of video end credits.

19. The service provider system of claim 11, wherein the statistics include number of score with negative values, number of videos successfully tagged, median time that tags were early, median time that tags were late, average time that tags were early, and average time that tags were late.

20. A method for next episode automation in a video, the method comprising:
generating, by multiple automated video end credits processors, tags for training videos;
generating, by a tag-generation scoring system, combination tags from the tags, wherein combinations are done per training video;
generating, by the tag-generation scoring system, a score for each of the tags and the combination tags by comparing to training tags for the training videos, wherein a score reflects accuracy of a tag;
generating, by the tag-generation scoring system, statistics based on the comparisons and on the scores across all of the training videos;
selecting, by the tag-generation scoring system, an optimal combination by applying weights to the statistics;
generating, by the optimal combination, a tag for a user selected video; and
inserting, by a video end credits determination system, a next episode button at the tag generated for the user selected video.

* * * * *